May 12, 1936.  A. A. BLUE  2,040,727
VALVE
Filed Aug. 18, 1931  2 Sheets-Sheet 1
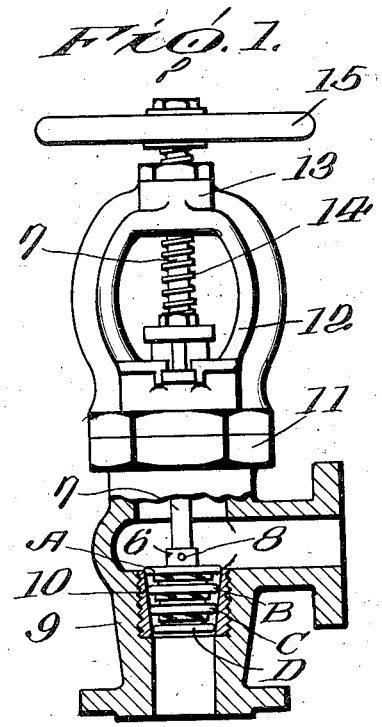
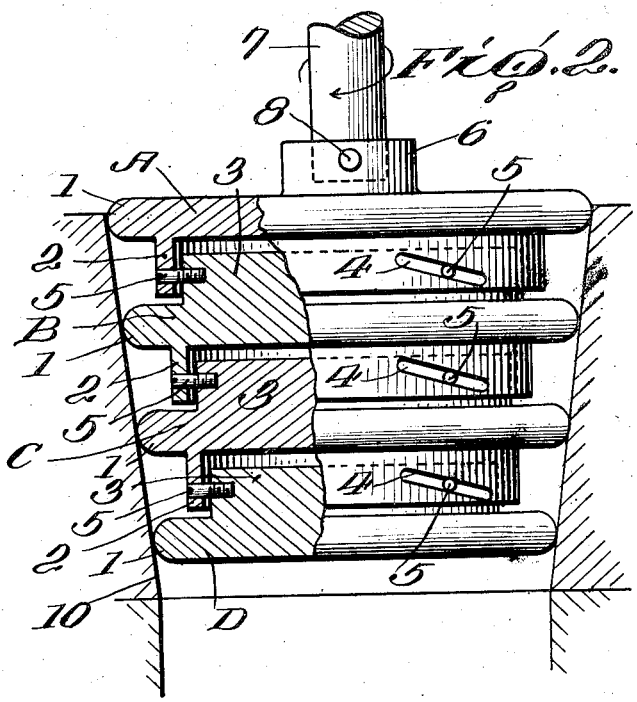
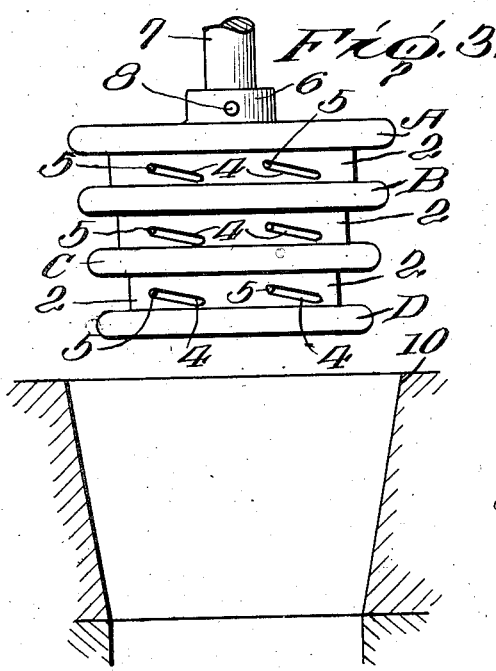
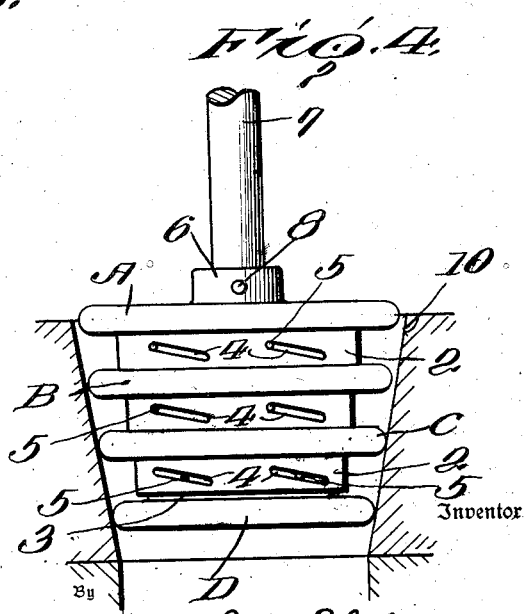
Inventor
A. A. Blue
By Pattison, Wright and Pattison
Attorneys May 12, 1936.   A. A. BLUE   2,040,727
VALVE
Filed Aug. 18, 1931   2 Sheets-Sheet 2
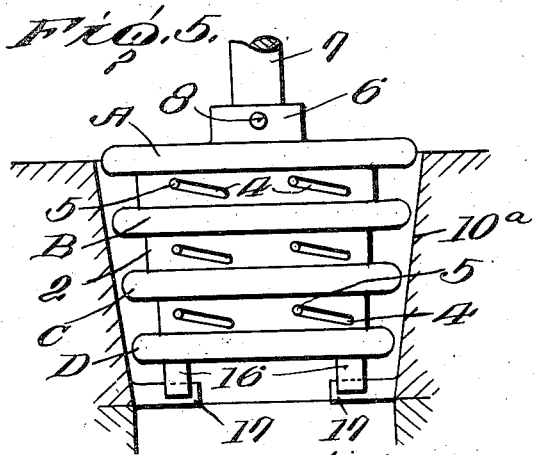
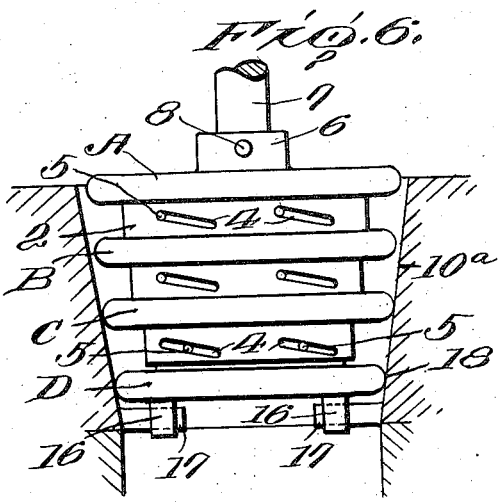
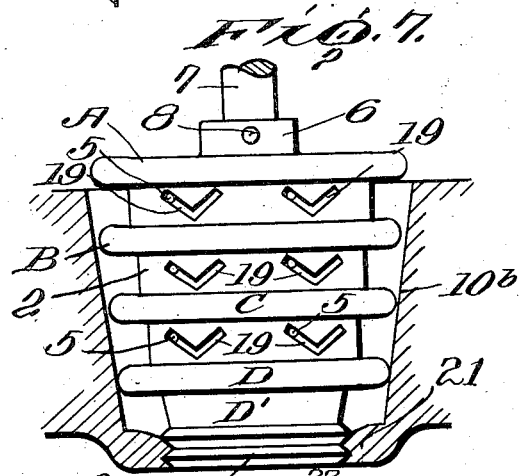
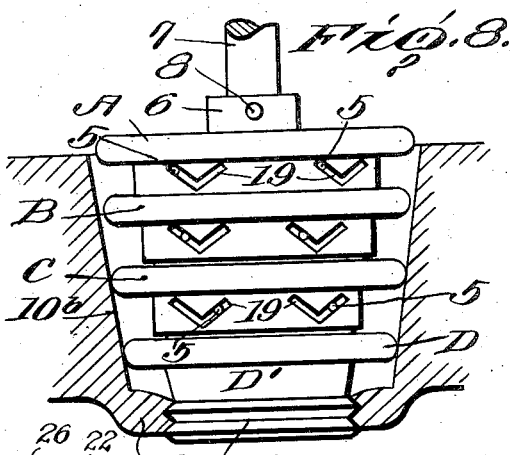
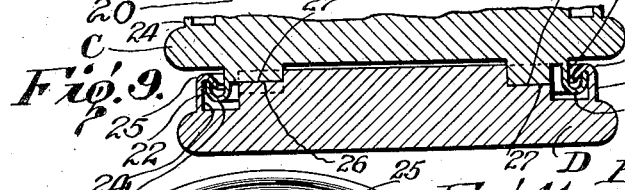
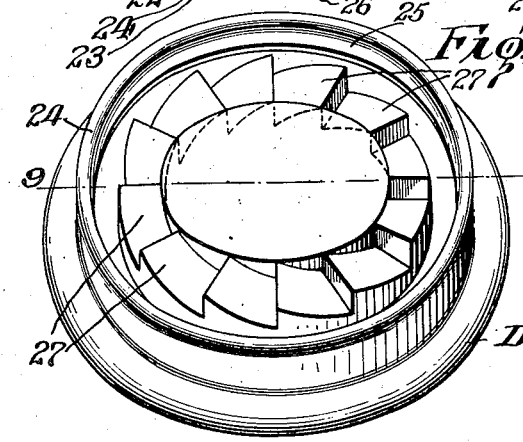
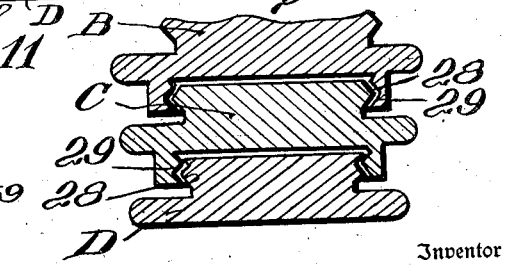
Inventor
A. A. Blue
By Patterson, Wright and Patterson
Attorneys Patented May 12, 1936

2,040,727

UNITED STATES PATENT OFFICE 2,040,727

VALVE

Arthur Ayling Blue, Sewickley, Pa.

Application August 18, 1931, Serial No. 557,921

20 Claims. (Cl. 251—159)

This invention relates to improvements in valves and is directed more particularly and specifically to a valve of the plug type made up of a plurality of plugs or discs having a lost motion connection with one another which when the valve is opened and closed extend and retract in respect to one another.

The primary object of the invention is the provision of a valve of the type described wherein the valve plugs or discs move in respect to one another for the purpose hereinafter described.

A further object of the invention is the provision of a valve of a plug type made up of a multiplicity of plug or disc units having lost motion connection with one another.

A still further object of the invention is the provision of an improved valve of the plug type composed of a plurality of plugs or discs having a lost motion connection with one another in combination with the valve seat for said plug having means for engaging and retarding the movement of one of said plugs or discs.

A still further object of the invention is the provision of a valve of the character described wherein the lost motion connection between the discs or plugs making up the valve is of novel and improved construction.

Further specific novel features of construction and improved results of the invention will appear in more detail from the following description taken in conjunction with the accompanying drawings.

In the drawings:

Figure 1 is a view in side elevation a portion of the view broken away in vertical section and illustrating the improved valve plug in conjunction with its seat and the valve plug operating means.

Fig. 2 is a view in side elevation and partial vertical section illustrating the valve plug in closed position upon its seat.

Fig. 3 is a view in side elevation with the valve seat shown in vertical section, the valve plug being illustrated as removed from its seat with the discs of the valve plug in their contracted positions.

Fig. 4 is a view in side elevation with the valve seat in vertical section, the plug being illustrated as in the valve seat with the lower valve plug disc engaging the seat and the remaining valve plug discs ready to be extended or separated from one another to effect a seating of all of the discs.

Fig. 5 is a view in side elevation of a modified form of the invention, the valve seat being shown in vertical section, and the valve plug being illustrated in its open position.

Fig. 6 is a view in side elevation of a modified form of the construction shown in Figure 5 the valve seat being shown in vertical section and the valve plug illustrated as partially closed.

Fig. 7 is a view in side elevation of a still further modified form of construction, the valve seat being shown in vertical section and the valve plug illustrated in the valve seat with the valve plug in an open position.

Fig. 8 is a view in side elevation of the modified form of construction shown in Figure 7, the valve seat being in vertical section and the valve plug illustrated as partially closed.

Fig. 9 is a fragmentary vertical sectional view of a construction constituting a still further modification of the invention.

Fig. 10 is a fragmentary vertical sectional view illustrating a construction of another and further modified form.

Fig. 11 is a perspective view of the upper side or face of one of the valve discs appearing in Fig. 9.

In consideration of the present valve plug constituting this invention it should be noted that in respect to valves of the plug type as at present known and in use it is necessary to finish the plugs and seats to extremely fine limits in order to make the valves tight so that they will not leak. A leak-proof closing of the valve of the present invention is accomplished without the necessity of a close finishing of the valve plug and the seat thus cheapening the manufacture of the valve and its seat, yet at the same time producing a valve which is highly efficient in operation and has the many advantages which will appear in the detailed description of the valve.

Describing the valve structure broadly and having reference to the drawings and particularly Figure 2 thereof, it will be seen that the valve plug is made up of a series of discs A, B, C, and D. The number of discs going into the make-up of a valve plug can be varied to meet the particular requirements of the valve which would include the particular depth of the valve seat and the pressures under which the valve must operate and other variables.

Referring to the discs it will be seen that they are shown as having rounded peripheral edges 1 but this construction can be varied at will as under some conditions it might be desirable to have a packing of some kind in the edges of the discs or to make the discs with flat edges. The upper disc A has a depending circumferential flange or skirt 2. The intermediate discs B and C have above the disc portion an upwardly extending circular shaped lug 3 and below the disc portion a downwardly extending circumferential flange or skirt 2 of a similar construction to the skirt 2 of the upper disc A. The lower disc D does not have a downwardly extending skirt but is provided with the rounded peripheral edge 1 above the disc. All of the skirts 2 are provided with diagonally extending or inclined slots 4 and all of the lugs 3 are provided with outwardly extending pins 5. Positioned centrally of the upper disc A is a collar 6 in which is fixed the lower end of the valve stem 7 and held in said collar against rotation by a pin 8 or the like.

Figure 1 is an illustrative showing of the manner in which the valve is to be used. Here it will be seen that the valve body 9 is provided with the valve seat 10 which as is ordinarily the practice, is threadedly secured in the valve body for removal or replacement. Secured to the flange 11 of the valve body is a yoke 12 which in its head 13 threadedly receives the threaded portion 14 of the valve stem 7. The valve stem extends beyond the head of the yoke and carries a wheel 15 by which the valve stem is rotated.

Describing the structures appearing in Figures 1 to 4 inclusive it will be seen that most of the figures are diagrammatic showings illustrating the manner of operation of the valve. In these figures the valve seat is indicated at 10 just as it is similarly indicated in Figure 1 of the drawings. Fig. 3 illustrates the usual condition of the multiple plug valve when the valve is open or the plug is removed from the seat. The valve is shown to turn right on closing while in opening the rotation would be left. The opening of the valve by turning the stem to the left brings the pins 5 to the left end of the slots and contracts the discs as illustrated in Figure 3 of the drawings. In effecting a closing of the valve the stem is turned to the right by the wheel 15 and the entire plug is rotated until one of the discs is brought in contact with the valve seat 10. In this form of the invention the angle formed by the outer edges of the valve discs when the discs are in their contracted positions as illustrated in Figure 3 is slightly less than the angle of the valve seat. Consequently when the valve plug is lowered by the rotation of the stem the lowermost disc D is first to engage the valve seat as clearly appears in Figure 4 of the drawings. The rotation of the disc D upon engaging the valve seat is retarded or stopped. The disc C immediately above however is still rotating with the result that the action of the pin 5 carried by the lower disc in the slot 4 of the next disc C forces the disc D further downward into the valve seat. This downward movement of the disc D causes a slight flexing of the extending peripheral edges of this disc. This downward movement together with the concurrent downward movement imparted by the rotation of the valve stem continues until the disc C comes in contact with the valve seat. The same action between the pins and slots of the discs B and C then takes place as has been described in respect to the pins and slots of the discs D and C and this downward motion or movement imparted by the slots and discs is repeated in respect to each of the discs until all of them have been sufficiently flexed or driven downwardly to cause their engagement with the valve seat 10.

During the time it has taken to engage all of the discs with the valve seat the lower disc has as a consequence been forced tighter and tighter upon the valve seat with the final result that when the valve stem can be rotated no further the discs are seated with varying pressures which vary upward. That is to say the lowermost disc engages the valve seat the tightest and the uppermost discs and valves engage the valve seat under the least pressure.

To result in the seating of all of the discs as described requires the application of a sufficient pressure through the rotation of the valve stem to force the lower disc downwardly a sufficient distance to permit the upper discs to make contact with the valve seat. The amount of downward movement necessary to effect a seating of all of the discs would of course be dependent upon angle of inclination of the valve seat and angle of taper of the plug valve.

From the foregoing it will be seen that in the operation of closing the valve three movements are simultaneously taking place once one of the discs engage the seat. The three movements are the rotation of the valve stem; the downward travel of the valve plug caused by the rotation of the stem and the rotation of one valve plug disc upon the other which causes an additional downward movement of the valve discs successively.

Referring to Figures 5 and 6, a modified form of the invention is here illustrated although the plug valve is practically the same as heretofore described in that it is made up of the discs A, B, C and D which are provided with the inclined slots 4 and the pins 5 working therein. The plug is rotated by the same stem 7 attached or fastened in the collar 6 by the pin 8 or the equivalent. In this particular form the valve seat 10a has an angle approximately the same as the angle of the valve plug when the discs thereof are separated which means that when the discs are in a contracted position the angle of the plug is greater than the angle of the valve seat. Consequently if the plug valve is moved or lowered with the discs in their contracted position, as illustrated in Figure 5, the top disc only would come in contact with the seat. To overcome this result the lower valve disc D is provided with downwardly projecting lugs 16 while the valve seat at its bottom is provided with inwardly projecting lugs 17 which form obstructions which are engaged by the lugs 16 of the lower disc and prevent the lower disc from rotating yet do not prevent the lower disc from moving downwardly into the seat opening. By stopping immediately the rotation of the lower disc an advancement of this disc from the other discs of the plug valve is caused until the peripheral edge of the lower disc engages the valve seat as indicated at 18 in Figure 6. The operation then described in respect to the valve structure shown in Figures 1 to 4 inclusive then takes place, namely, the action of the pins and slots due to the rotation of the plug discs above the lower disc D causes these discs to move downwardly until they successively engage the valve seat.

It is understood of course that it is essential for the valve and the seat to be so made that the topmost disc A will not strike or engage the seat until the lower ones have done so. This structure has the advantage that it will be more positive in action than the structure illustrated in Figures 1 to 4 inclusive and as the angle of the extended discs is practically the same as that of the valve seat there will be a less difference in the pressure of engagement with the valve seat of the top disc and the bottom disc than there is in the valve structure illustrated in Figures 1 to 4 of the drawings and less pressure upon the valve stem 7 will be required to cause all the discs to seat.

Figures 7 and 8 illustrate a still further modified form of the invention. Here it will be seen the valve discs A, B, C and D are provided with V-shaped slots 19 in which the pins 5 operate and the lower valve disc D is provided with an extension D' having a threaded end 20 which is adapted to threadedly engage the threaded extension 21 at the bottom of the valve seat 10b. The valve is provided with the same rotatable threaded valve stem 7 secured as at 8 in the collar 6 carried by the top of the upper valve disc A. The two valve structures previously described have necessitated the application of pressure to the upper surfaces of the disc whereas in this construction the discs are pulled into place from the bottom of the valve seat. When the valve plug is first lowered into the seat as illustrated in Figure 7, it will be seen that the threaded lower end 20 of the lower disc threadedly engages the threaded extension 21 at the bottom of the valve seat before any of the discs engage the valve seat. Immediately the threads 20 of the lower disc engage the threaded portion of the valve seat the rotation imparted to the lower disc by the valve stem is retarded with the result that the disc C immediately above the lower disc rotates more rapidly than does the lower disc and the pins 5 will travel down the left hand sides of the V-shaped slots and start up the right hand sides thereof which will pull this disc C and the discs above it downward. The travel of the pins 5 of the lower disc up the right hand sides of the V-shaped slots will of necessity pull the upper valve discs downwardly as the pins of the lower disc are anchored by the threaded engagement of the lower disc with the valve seat. When the disc C is pulled downwardly sufficiently far to engage the valve seat with a sufficient pressure or friction to prevent the rotation of this disc, as is illustrated in Figure 8 of the drawings, the rotation of the action of the pins in the V-shaped slots in the disc B takes place until this disc is pulled downwardly into engagement with the seat with sufficient pressure to stop rotation of this disc and then finally and last the upper disc is pulled downwardly into engagement with the seat through the action of the pins of the disc B in the V-shaped slots in the upper disc A. Thus it will be seen that the action of the pins and the slots is progressive upwardly in respect to the discs and takes place progressively to pull the discs downwardly as each individual disc comes into a pressure or frictional contact with the valve seat of a sufficiency to prevent the rotation of the disc. This construction provides for a uniform seating of all the discs although this construction is a little more complicated than the constructions heretofore described.

The principle upon which my improved valve operates and the action of one valve disc upon and in respect to the others has been illustrated and described as taking place through the means of pins moving in inclined slots. It is recognized and realized however that the same principle of operation can be obtained in other ways such as for instance through ordinary screw threads or inclined surfaces.

In Figure 9 of the drawings I have illustrated how the operation of the multi-disc plug valve can be obtained through the use of inclined surfaces. Here the lower disc D and the disc C above it are secured loosely together by having on the disc C a downwardly depending circumferential flange or collar 22 having a turned lower edge 23 while the lower disc has an upwardly extending circumferential flange or collar 24 having an inwardly and downwardly turned upper edge 25 which engages and rotates on the up-turned edge 23 of the flange 22 of the disc C. The disc C on its lower face has inclined surfaces 26 while the disc D upon its upper face has inclined surfaces 27 which match and engage the inclined surfaces 26 of the disc C. It will be understood that the discs A and B are constructed in a similar manner and secured together in a similar manner as that described. Thus it will be seen that the rotation of the discs by the valve stem will cause a separation of the discs and it is this separation which causes the disc to progressively engage and seat under pressure upon the valve seat.

Figure 10 is illustrative of how the same principle of operation for multi-disc plug valves can be secured by the use of screw threads. Here the lower disc D and the disc C immediately thereabove are shown connected by threads 28 on the lower disc and 29 of the disc thereabove. This construction is repeated on up through the discs B and A.

Variations can of course be made and may be desirable in certain circumstances for the particular use to which the valve is to be put. As an instance, the slope or inclination of the slots may be varied in each disc. The slope or inclination or the slots in the disc C may be made less steep than the slots in the discs above it and this one in turn may have its slots less steep than the disc above it. With such a construction the resistance to the sliding of the pin in the slots of the disc C will be less than the resistance of the sliding of the pins in the steeper slots in the disc B and so on upwardly through the discs. This would mean that the upper or top disc would engage the valve seat with a greater pressure than does the lowermost disc which is a condition which might be desirable under certain circumstances.

From the foregoing it will be seen that I have provided the plug valve made up of a plurality of discs which involves the broad principle of a lost motion connection between the discs making up the plug and a construction which causes the discs to act upon one another so that they advance or separate from one another progressively to insure a pressure contact of all the discs with the valve seat and that the amount of pressure engagement of the discs with the valve seat increases upwardly or downwardly through the respective discs as may be desired. The action of one disc upon the other is brought about by the engagement of one disc with the valve seat. In carrying out the invention this principle of operation can be accomplished in numerous ways as has been illustrated in the drawings.

I have described the construction and operation of several species constructed to carry out my present invention, and for the purpose of broadly, or generically covering all of said described constructions, or their mechanical equivalents in operation, the term "cam connection" used in the claims is to be understood as inclusive of any construction which operates in substantially the same manner as those herein described.

I believe myself to be the first to have conceived of a valve plug made up of a plurality of discs which operate in the manner and for the purpose described.

Having thus described my invention what I claim and desire to secure by Letters Patent is:—

1. An improved valve of the plug type, combining a tapered valve seat with a tapered plug composed of a plurality of solid seat engaging members in the form of discs arranged in superposed relationship, a rotatable stem connected to one of said discs, cam means interconnecting said discs in series and providing a driving connection between them whereby all of said discs can be simultaneously rotated by said stem, and said cam connecting means permitting independent rotation of each disc by rotation of the stem, for the purpose described.

2. An improved valve of the plug type, combining a tapered valve seat with a tapered plug comprised of a plurality of solid seat engaging members connected in series by means of helically disposed cam threads which permit independent limited rotation of each member, and means to rotate the plug.

3. An improved valve of the plug type, combining a tapered valve seat with a tapered plug comprised of a plurality of solid seat engaging members connected in series by means of engaging pins and slots which permit independent limited rotation and independent axial movement of each member, and means to rotate the plug.

4. An improved valve of the plug type, combining a tapered valve seat with a tapered plug, comprised of a plurality of solid seat engaging members, said members connected in series by cam means which permit independent limited rotation of each member, and said cam means causing coincident with such independent rotation of any member, axial movement of that member away from its next above fellow member or axial movement towards said next fellow member, and means to rotate the plug.

5. An improved valve of the plug type, combining a tapered valve seat with a tapered plug comprised of a plurality of solid seat engaging members, said members connected in series by means of cams in the form of threads which permit independent limited rotation of each member, and, coincident with such independent rotation of any member, axial movement of that member from its next above fellow member or contraction thereto, and means to rotate the plug.

6. An improved valve of the plug type, combining a tapered valve seat with a tapered plug comprised of a plurality of solid seat engaging members, said members connected in series by means of helically disposed cams in the form of engaging pins and slots, and said connection permitting independent limited rotation of each member, and, coincident with such independent rotation of any member, relative axial movement of that member to its next above fellow member, and means to rotate the plug.

7. An improved valve of the plug type, combining a tapered valve seat with a tapered plug comprised of a plurality of solid seat engaging members connected in series by helically disposed cams which permit independent limited rotation of each member, and, upon the stopping of the rotation of any member said connection causing relative axial movement of it to its next above fellow member, and means to rotate the plug.

8. An improved valve of the plug type, combining a tapered valve seat with a tapered plug comprised of a plurality of solid seat engaging members connected in series by means of spirally disposed cams in the form of threads which permit independent limited rotation of each member, and, upon the stopping of the rotation of any member relative axial movement of it from its next above fellow member, and means to rotate the plug.

9. An improved valve of the plug type, combining a tapered valve seat with a tapered plug comprised of a plurality of solid seat engaging members connected in series by means of helically disposed cams in the form of engaging pins and slots which permit independent limited rotation of each member, and, upon the stopping of the rotation of any member, said cams causing relative axial movement of said member from its next above fellow, and means to rotate the plug.

10. An improved valve of the plug type, combining a tapered valve seat with a tapered plug comprised of a plurality of solid seat engaging members connected by helically disposed cams which permit independent limited rotation of each member, and, upon the stopping of the rotation of any member and the continued rotation of the next above member, relative axial movement of these members to one another, and means to rotate the plug.

11. An improved valve of the plug type, combining a tapered valve seat with a tapered plug comprised of a plurality of solid seat engaging members connected in series by helically disposed cams which permit independent limited rotation of each member, said members carried by a stem threadedly engaged in a fixed nut, means to rotate the stem and move said members into the valve seat, one of said members engaging the seat prior to the engagement of the seat by the other members, causing progressive seating of the remaining members upon the continued rotation of the valve stem.

12. An improved valve of the plug type, combining a tapered valve seat with a tapered plug comprised of a plurality of solid seat engaging members helically disposed cams connecting said members in series to permit independent limited rotation of each member, said members carried by a stem threadedly engaged in a fixed nut, means to rotate the stem and move said members into the valve seat, one of said members engaging the seat prior to the engagement of the seat by the other members, causing progressive seating of the remaining members under progressive varying pressures upon the continued rotation of the valve stem.

13. An improved valve of the plug type, combining a tapered valve seat with a tapered plug, comprised of a plurality of solid seat engaging members, cam means connecting said members in series to permit independent limited rotation of each member, said cam connections having a pitch or angle varying progressively from one connection to the next throughout the plug, said members carried by a stem threadedly engaged in a fixed nut, means to rotate the stem and move said members into the valve seat, one of said members engaging the seat prior to the engagement of the seat by the other members, causing progressive seating of the remaining members upon the continued rotation of the valve stem.

14. An improved valve of the plug type, combining a tapered valve seat with a tapered plug comprised of a plurality of solid seat engaging members arranged in superimposed relation and graduated in diameter with the smallest member at the outer end of the plug, said members connected in series by cam means which permit independent limited rotation of each member, said members carried by a valve stem threadedly engaged in a fixed nut, means to rotate the stem and move said members into said valve seat, the smallest of said members seating on the valve seat first, causing said member to stop rotating and to move axially away from the succeeding members, which succeeding members then progressively also seat, stop rotating and also move axially from one another, upon the continued rotation of the stem.

15. An improved valve of the plug type, combining a tapered valve seat with a tapered plug, comprised of a plurality of solid seat engaging members, arranged in superimposed relation and graduated in diameter with the smallest member at the outer end of the plug, said members connected in series by cam means which permit independent limited rotation of each member, said members carried by a valve stem threadedly engaged in a fixed nut, means to rotate the stem and move said members into said valve seat, the smallest of said members carrying a projection which engages with a projection at the small end of the valve seat, causing said member to stop rotating and to move axially from the succeeding members and to seat upon the valve seat, the succeeding members then progressively seating, stopping rotation and moving axially in respect to one another, upon the continued rotation of the stem.

16. An improved valve of the plug type, combining a tapered valve seat with a tapered plug comprised of a plurality of solid seat engaging members arranged in superimposed relation and graduated in diameter with the smallest member at the outer end of the plug, said members connected in series by cam means which permit independent limited rotation of each member, said cam constituting a helical connection providing a reverse helical action by means of pins engaging in V slots, said members carried by a valve stem threadedly engaged in a fixed nut, means to rotate the stem and move said members into said valve seat, the smallest of said members carrying a projecting male threaded section which engages with a threaded female section at the small end of the valve seat, causing said member to stop rotating after the threads engage, and to move axially from the succeeding members and then to draw the succeeding members down on the valve seat, the succeeding members then progressively seating and drawing following members down on the seat, upon the continued rotation of the stem.

17. An improved valve of the plug type, combining a tapered valve seat with a tapered plug comprised of a plurality of solid seat engaging members arranged in superimposed relation and graduated in diameter with the smallest member at the outer end of the plug, said members being connected in series by cam means which permit independent limited rotation, the connection being by means of pins carried by one of said members and extending into and interacting with slots carried by an adjacent member and arranged at inclined angles, said members carried by a valve stem threadedly engaged in a valve nut, means to rotate the stem, and move said members into the valve seat, the smallest of said members seating on the valve seat first, causing said member to stop rotating and to move axially from the succeeding members, which then progressively also seat, stop rotating and move axially in respect to one another, upon the continued rotation of the stem.

18. An improved tapered valve construction comprising a plurality of valve members located and constructed to close against the tapered valve seat from its smallest to its largest end, a valve stem operatively connected with the large valve member, said valve member having a cam connection with succeeding valve members whereby the cam serves to cause the small valve member to first engage the tapered seat and the remaining valve members to engage the tapered seat successively from the said small valve member.

19. An improved valve construction comprising a tapered valve seat, a plurality of valve members adapted to engage the tapered seat at different points throughout the depth of said seat, a valve stem operatively connected with one of the said valve members, said valve members having cam connections one with the other and thereby having driving connection with said stem, means whereby upon rotation of the stem the construction moves into the valve seat to cause the small valve member to engage said tapered seat, and the cam connections between the valve members causing them to engage the tapered seat surface in succession from the smallest to the largest diameter thereof, substantially as set forth.

20. An improved valve of the plug type, comprising a tapered valve seat, a plurality of solid valve members adapted to progressively engage said seat to provide a plurality of closures on said seat, said valve members connected one to the other in series by cam means, said cam means being such as to provide rotary driving connection between the members and at the same time permitting limited independent rotation of the remaining members in respect to any member the rotation of which is stopped, and means to rotate said plug made up of said plurality of members, the parts operating for the purpose described.

ARTHUR AYLING BLUE.